(12) United States Patent
Ikeda et al.

(10) Patent No.: US 11,846,224 B2
(45) Date of Patent: Dec. 19, 2023

(54) UREA REMOVING APPARATUS

(71) Applicant: ISUZU MOTORS LIMITED, Tokyo (JP)

(72) Inventors: Takashi Ikeda, Fujisawa (JP); Hikaru Ishii, Fujisawa (JP); Shinji Goto, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 18/182,328

(22) Filed: Mar. 11, 2023

(65) Prior Publication Data
US 2023/0323801 A1    Oct. 12, 2023

(30) Foreign Application Priority Data

Mar. 25, 2022 (JP) .................................. 2022-049832

(51) Int. Cl.
*F01N 3/20* (2006.01)
*F02D 41/02* (2006.01)
(Continued)

(52) U.S. Cl.
CPC ......... *F01N 3/208* (2013.01); *B01D 53/9413* (2013.01); *F01N 11/00* (2013.01); *F02D 41/0245* (2013.01); *F02D 41/401* (2013.01); *B01D 2251/2067* (2013.01); *F01N 2550/02* (2013.01); *F01N 2610/144* (2013.01); *F01N 2610/1453* (2013.01)

(58) Field of Classification Search
CPC ...... F01N 3/208; F01N 11/00; F01N 2550/02; F01N 2610/144; F01N 2610/1453; F01N 2430/00; F01N 2610/02; B01D 53/9413; B01D 2251/2067; F02D 41/0245; F02D 41/401
See application file for complete search history.

(56) References Cited

U.S. PATENT DOCUMENTS 9,255,511 B2 * 2/2016 Watanabe ............... F01N 3/023
2011/0107742 A1 5/2011 Igarashi et al.
(Continued)

FOREIGN PATENT DOCUMENTS

JP 2010-031746 A 2/2010
JP 2011-117441 A 6/2011
(Continued)

*Primary Examiner* — Brandon D Lee
(74) *Attorney, Agent, or Firm* — Shih IP Law Group, PLLC (57) ABSTRACT

A urea removing apparatus has: a determining section that determines whether or not a urea aqueous solution is injected from an injection nozzle when control is performed to inject the urea aqueous solution from the injection nozzle into an exhaust pipe where exhaust gas of an engine flows; a supply control section that controls a pump that supplies the urea aqueous solution to the injection nozzle from a tank that stores the urea aqueous solution, and causes the urea aqueous solution to be supplied from the tank to the injection nozzle in a case that it is determined that the urea aqueous solution is not injected from the injection nozzle; and a temperature control section that performs control to raise the temperature of exhaust gas in a state where the urea aqueous solution supplied from the tank has been poured into the injection nozzle.

9 Claims, 4 Drawing Sheets

(51) Int. Cl.
    *F01N 11/00*     (2006.01)
    *F02D 41/40*     (2006.01)
    *B01D 53/94*     (2006.01)

(56) References Cited

U.S. PATENT DOCUMENTS

2013/0269321 A1     10/2013   Watanabe et al.
2018/0163605 A1     6/2018   Gharpure et al.

FOREIGN PATENT DOCUMENTS

| JP | 2012-082819 A | 4/2012 |
| JP | 2017-078345 A | 4/2017 |
| WO | 2012/090801 A1 | 7/2012 |

* cited by examiner

FIG. 1

| TEMPERATURE [°C] | SOLUBILITY [g/100ml] |
|---|---|
| 20 | 107.9 |
| 40 | 167 |
| 60 | 251 |
| 80 | 400 |

UREA REMOVING APPARATUS

CROSS-REFERENCE TO RELATED APPLICATIONS

The present application claims priority to Japanese Patent Application number 2022-049832, filed on Mar. 25, 2022, contents of which are incorporated herein by reference in their entirety.

BACKGROUND OF THE INVENTION

The present invention relates to a urea removing apparatus that removes urea adhered to an injection nozzle that injects a urea aqueous solution.

There are known technologies by which a urea aqueous solution is injected to exhaust gas of an engine to reduce nitrogen oxides (NOx). For example, Japanese Unexamined Patent Application Publication No. 2010-31746 discloses a technology by which a urea aqueous solution remaining in an injection nozzle is removed by injecting pressurized air after the urea aqueous solution is injected from the injection nozzle.

BRIEF SUMMARY OF THE INVENTION

However, even if the pressurized air is injected, the urea aqueous solution remains in the injection nozzle in some cases undesirably. If the urea aqueous solution remaining in the injection nozzle is heated, a problem that urea is precipitated and adhered occurs.

The present invention has been made in view of these matters, and an object of the present invention is to make it easier to remove urea adhered to an injection nozzle.

An aspect of the present invention provides a urea removing apparatus including: a determining section that determines whether or not a urea aqueous solution is injected from an injection nozzle when control is performed to inject the urea aqueous solution from the injection nozzle into an exhaust pipe where exhaust gas of an engine flows; a supply control section that controls a pump that supplies the urea aqueous solution from a tank that stores the urea aqueous solution to the injection nozzle, and causes the urea aqueous solution to be supplied from the tank to the injection nozzle in a case that it is determined that the urea aqueous solution is not injected from the injection nozzle; and a temperature control section that performs control to raise a temperature of exhaust gas in a state where the urea aqueous solution supplied from the tank has been poured into the injection nozzle.

DETAILED DESCRIPTION OF THE INVENTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

[Configuration of Purification System S]

Figure 1:
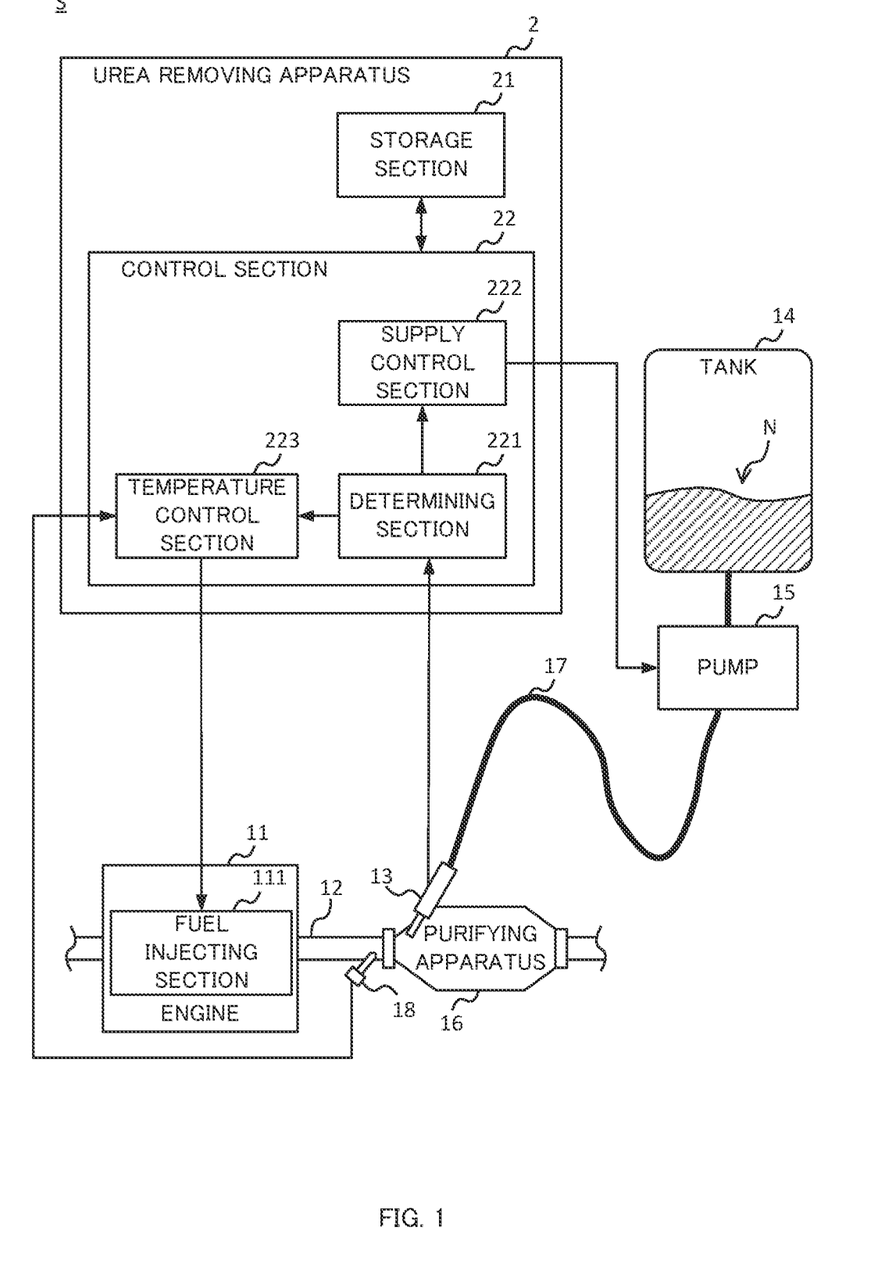
FIG. 1 is a figure for explaining the configuration of a purification system that purifies exhaust gas.

FIG. 1 is a figure for explaining the configuration of a purification system S that purifies exhaust gas. The purification system S includes an engine 11, an injection nozzle 13, a tank 14, a pump 15, a purifying apparatus 16, a tube 17 and a urea removing apparatus 2. For example, the purification system S is mounted on an automobile or a ship.

The engine 11 is a diesel engine that combusts and expands an air-fuel mixture of a fuel and an intake gas (air), and generates motive power. A fuel injecting section 111 injects the fuel to a combustion chamber of the engine 11 under the control of the urea removing apparatus 2. Exhaust gas of the engine 11 is discharged to the outside through an exhaust pipe 12.

The purifying apparatus 16 purifies exhaust gas of the engine 11. The purifying apparatus 16 is a selective catalyst reduction denitrification apparatus (so-called urea SCR (Selective Catalytic Reduction)) provided in the exhaust pipe 12 where exhaust gas of the engine 11 flows. The selective catalyst reduction denitrification apparatus injects a urea aqueous solution N which is a precursor of ammonia to exhaust gas flowing through the exhaust pipe 12 to thereby cause a reaction between NOx and ammonia, and reduce them to nitrogen and water.

A temperature sensor 18 is a sensor unit that includes a thermocouple or a thermistor that senses the temperature of exhaust gas flowing into the purifying apparatus 16. The temperature sensor 18 is provided upstream of the purifying apparatus 16, and senses the temperature of exhaust gas flowing into the purifying apparatus 16. It is sufficient if intervals at which the temperature sensor 18 senses the temperature of exhaust gas are set as appropriate, and, for example, are set to the length of the processing cycle of a microprocessor of the sensor unit, and specifically to 100 milliseconds.

The injection nozzle 13 injects the urea aqueous solution N to the purifying apparatus 16. The urea aqueous solution N is stored in the tank 14. The urea aqueous solution N is supplied from the tank 14 to the injection nozzle 13 through the tube 17. For example, the tube 17 is a silicon tube or a rubber tube.

The pump 15 is a pump that supplies the urea aqueous solution N from the tank 14 to the injection nozzle 13 under the control of the urea removing apparatus 2. In addition, the pump 15 can feed the urea aqueous solution N from the injection nozzle 13 to the tank 14 under the control of the urea removing apparatus 2. For example, by feeding the urea aqueous solution N from the injection nozzle 13 to the tank 14 when the engine 11 is stopped, the pump 15 discharges the urea aqueous solution N from the injection nozzle 13.

Meanwhile, even if the urea aqueous solution Nis discharged from the injection nozzle 13, the urea aqueous solution N remains in the injection nozzle 13 in some cases. If the urea aqueous solution N remaining in the injection nozzle 13 is heated by high-temperature exhaust gas, residual heat of exhaust gas or the like, urea precipitated due to evaporation of the moisture of the urea aqueous solution N undesirably adheres to the inside of the injection nozzle 13. In view of this, in a case that urea is adhered to the inside of the injection nozzle 13, the urea removing apparatus 2 raises the temperature of exhaust gas in a state where the urea aqueous solution N has been poured into the injection nozzle 13, to thereby raise the temperature of the urea aqueous solution N having been poured into the injection nozzle 13. Since the aqueous solubility of urea rises thereby, it becomes easier to cause the urea adhered to the injection nozzle to be melted in a urea aqueous solution, and the adhered urea can be removed.

The configuration of the urea removing apparatus 2 is explained below.

The urea removing apparatus 2 has a storage section 21 and a control section 22. The storage section 21 is a storage medium including a ROM (Read Only Memory), a RAM (Random Access Memory), a hard disk and the like. The storage section 21 has stored thereon a program to be executed by the control section 22.

For example, the control section 22 is a computational resource including a processor such as a CPU (Central Processing Unit). By executing a program stored on the storage section 21, the control section 22 realizes functionalities as a determining section 221, a supply control section 222 and a temperature control section 223.

The determining section 221 performs injection control to inject the urea aqueous solution N from the injection nozzle 13. Specifically, the determining section 221 performs injection control to apply a predetermined injection voltage to the injection nozzle 13, and inject the urea aqueous solution N in the injection nozzle 13 into the purifying apparatus 16. If the urea aqueous solution N is injected from the injection nozzle 13 when the injection voltage is applied, the difference between a local maximum and a local minimum of a function representing temporal changes of a current value until predetermined determination time elapses since the application of the injection voltage becomes equal to or greater than a determination threshold. On the other hand, if the urea aqueous solution N is not injected from the injection nozzle 13 when the injection voltage is applied, the difference between a local maximum and a local minimum of the function representing temporal changes of the current value becomes smaller than the determination threshold.

The determining section 221 determines whether or not the urea aqueous solution N is injected from the injection nozzle 13 when the injection control is performed. For example, the determining section 221 performs the injection control while diagnostic control to determine whether or not the purifying apparatus 16 that purifies exhaust gas is functioning normally is being implemented, and determines whether or not the urea aqueous solution N is injected from the injection nozzle 13. Specifically, the determining section 221 determines whether or not the urea aqueous solution N is injected on the basis of whether or not the difference between a local maximum and a local minimum of the function representing temporal changes of the current value until the determination time elapses since the application of the injection voltage to the injection nozzle 13 is equal to or greater than the determination threshold. The determining section 221 determines that the urea aqueous solution N is injected if the difference between a local maximum and a local minimum of the function representing temporal changes of the current value is equal to or greater than the determination threshold. The determining section 221 determines that the urea aqueous solution N is not injected from the injection nozzle 13 if the difference between a local maximum and a local minimum is smaller than the determination threshold. Note that the determining section 221 may determine whether or not the urea aqueous solution N is injected from the injection nozzle 13 not by the method described above, but by another method.

In a case that it is determined that the urea aqueous solution N is not injected from the injection nozzle 13, the supply control section 222 supplies the urea aqueous solution N from the tank 14 to the injection nozzle 13. For example, the supply control section 222 controls the pump 15 to supply the urea aqueous solution N from the tank 14 to the injection nozzle 13. Specifically, the supply control section 222 performs supply/re-intake control to feed the urea aqueous solution N from the injection nozzle 13 back to the tank 14 once, and feed the urea aqueous solution N from the tank 14 to the injection nozzle 13 again, after the urea aqueous solution N is fed from the tank 14 to the injection nozzle 13. More specifically, the tube 17 connecting the injection nozzle 13 and the pump 15 is provided with a pipe with a siphon structure, and the supply control section 222 performs the supply/re-intake control multiple times to control the liquid surface of the urea aqueous solution N in the tube 17, to thereby replace air staying in the tube 17 with the urea aqueous solution N, and supply the urea aqueous solution N to the injection nozzle 13. When the urea aqueous solution N has been poured into the injection nozzle 13, urea adhered to the injection nozzle 13 starts melting into the urea aqueous solution N.

Figure 2:
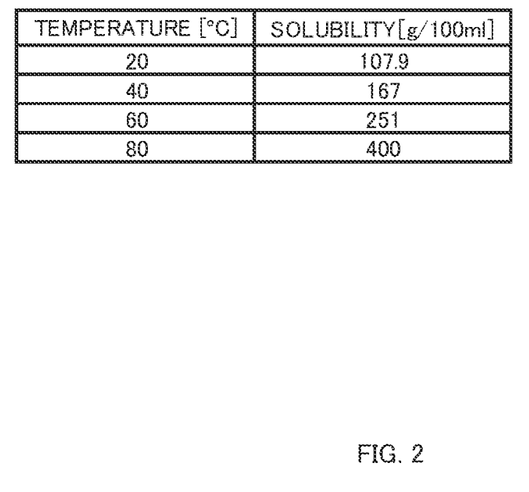
FIG. 2 is a table of the aqueous solubility of urea in relation to temperature.

Meanwhile, the aqueous solubility of urea increases as the temperature of water rises. FIG. 2 is a table of the aqueous solubility of urea in relation to temperature. As the temperature of the urea aqueous solution N having been poured into the injection nozzle 13 rises, the aqueous solubility of urea increases, and accordingly the likelihood that urea adhered to the injection nozzle 13 melts into the urea aqueous solution N increases. That is, in a case that the temperature of the urea aqueous solution N having been poured into the injection nozzle 13 is raised, urea adhered to the injection nozzle 13 can be caused to melt into the urea aqueous solution N in a shorter time than in a case that the temperature of the urea aqueous solution N is not raised.

The temperature control section 223 performs control to raise the temperature of exhaust gas in a state where the urea aqueous solution N supplied from the tank 14 has been poured into the injection nozzle 13. For example, the temperature control section 223 performs the control to raise the temperature of exhaust gas simultaneously with the start of control performed by the supply control section 222 to supply the urea aqueous solution N to the injection nozzle 13. In addition, the temperature control section 223 may perform the control to raise the temperature of exhaust gas after a lapse of predetermined waiting time since the start of control to supply performed by the supply control section 222. The waiting time is a length of time required for the urea aqueous solution N to have been poured into the injection nozzle 13 from the starting time point of the control to supply. Thereby, the temperature control section 223 can start the control to raise the temperature of exhaust gas in a state where the urea aqueous solution N has been poured into the injection nozzle 13.

The temperature control section 223 raises the temperature of exhaust gas by continuing heating control to perform fuel injection multiple times in the combustion chamber of the engine 11 in one combustion cycle. In the heating control by the temperature control section 223, the temperature of exhaust gas is raised by continuing control to perform fuel injection four times in the combustion chamber in one combustion cycle. Note that the number of times of fuel injection is not limited to four.

The temperature control section 223 raises the temperature of exhaust gas such that the temperature of the urea aqueous solution N having been poured into the injection nozzle 13 becomes equal to or higher than a lower limit temperature at which the aqueous solubility of urea becomes predetermined solubility. For example, the lower limit temperature is set to 80° C. at which the aqueous solubility of urea becomes [400 g/100 ml], and the temperature control section 223 raises the temperature of exhaust gas such that the temperature of the urea aqueous solution N having been poured into the injection nozzle 13 becomes equal to or higher than 80° C.

In a case that the engine load is low, and the temperature of exhaust gas is equal to or lower than a heating temperature, the temperature control section 223 raises the temperature of exhaust gas by continuing the heating control to perform the fuel injection multiple times in one combustion cycle. Specifically, by continuing the heating control until the temperature of exhaust gas becomes equal to or higher than the heating temperature, the temperature control section 223 makes the temperature of the urea aqueous solution N equal to or higher than the lower limit temperature (80° C.). The heating temperature is a temperature at which the temperature of the urea aqueous solution N in the injection nozzle 13 heated by exhaust gas having reached the injection nozzle 13 becomes equal to or higher than the lower limit temperature (80° C.). In other words, the heating temperature is such a temperature of exhaust gas that the temperature of the urea aqueous solution N can be made equal to or higher than the lower limit temperature (80° C.). In a case that the engine load is high, and the temperature of exhaust gas is higher than the heating temperature, the temperature control section 223 executes control to maintain the temperature of exhaust gas to maintain the temperature of the urea aqueous solution N at a temperature equal to or higher than the lower limit temperature (80° C.). For example, the temperature control section 223 executes the control to maintain the temperature of exhaust gas by causing fuel injection to the combustion chamber to be performed, in one combustion cycle, a number of times (e.g. once) which is smaller than the number of times of injection in the heating control.

By doing so, exhaust gas at a temperature equal to or higher than the heating temperature reaches the injection nozzle 13. Thereby, the injection nozzle 13 is heated, and the temperature of the urea aqueous solution N having been poured into the injection nozzle 13 becomes equal to or higher than the lower limit temperature. As a result, it becomes easier for the urea adhered to the injection nozzle 13 to melt in the urea aqueous solution N. Accordingly, it is possible to cause the adhered urea to melt in the urea aqueous solution N having been poured into the injection nozzle 13 in a shorter time than in a case that the urea aqueous solution N is not heated.

The determining section 221 continues causing an injection voltage to be applied to the injection nozzle 13 also while the heating control is being performed. Thereby, at a timing when urea having been adhered to the injection nozzle 13 melts in the urea aqueous solution N, the urea aqueous solution N in which the adhered urea has melted is injected from the injection nozzle 13, and accordingly the urea having been adhered to the inside of the injection nozzle 13 is removed. Since the difference between a local maximum and a local minimum of the function representing temporal changes of the current value becomes equal to or higher than the determination threshold when the urea aqueous solution N is injected from the injection nozzle 13, the determining section 221 determines that the urea aqueous solution N is injected. Then, the temperature control section 223 ends the heating control when the determining section 221 determines that the urea aqueous solution N is injected. Thereby, the temperature control section 223 can inhibit a situation where the injection nozzle 13 undesirably continues being heated even after the adhered urea is removed, and is undesirably heated to a temperature over the heatproof temperature of the injection nozzle 13.

Meanwhile, if the temperature of the injection nozzle 13 becomes a temperature higher than the heatproof temperature (e.g. 400° C.) of the injection nozzle 13, a urea-adhered material is adhered more rigidly, the injection nozzle 13 malfunctions, the performance of the injection nozzle 13 lowers, and so on. In view of this, the temperature control section 223 performs the control to raise the temperature of exhaust gas such that the temperature of the injection nozzle 13 becomes a temperature lower than an upper limit temperature according to the heatproof temperature of the injection nozzle 13. Specifically, if the temperature of exhaust gas is equal to or higher than the upper limit temperature, the temperature control section 223 stops the control to raise the temperature of exhaust gas. The upper limit temperature is a temperature that does not cause malfunctions and performance deterioration of the injection nozzle 13 due to heat, and is higher than the lower limit temperature. The upper limit temperature is in the range of 250° C. to 350° C. The upper limit temperature is desirably 280° C. The temperature of the injection nozzle 13 when the temperature of exhaust gas is equal to the upper limit temperature is lower than the heatproof temperature, and is higher than the lower limit temperature. Thereby, an excessive temperature increase of the injection nozzle 13 is inhibited, and the temperature of the injection nozzle 13 can be made a temperature lower than the heatproof temperature. Accordingly, malfunctions and performance deterioration of the injection nozzle 13 are inhibited.

Note that, due to the urea aqueous solution N having been poured into the injection nozzle 13, the quantity of heat that is necessary for increasing the temperatures of the injection nozzle 13 and the urea aqueous solution N increases, and accordingly an excessive temperature increase of the injection nozzle 13 is inhibited. In addition, in order to inhibit an excessive temperature increase of the injection nozzle 13, the temperature control section 223 may supply a coolant to cool the engine 11 to the injection nozzle 13. In this case, the purification system S includes a pipe that supplies the coolant to the injection nozzle 13, and a pump that supplies the coolant from the pipe to the injection nozzle 13. When the temperature of exhaust gas has become equal to or higher than the upper limit temperature, the temperature control section 223 controls the pump that supplies the coolant to supply the coolant to the injection nozzle 13.

The temperature control section 223 continues the control to raise the temperature of exhaust gas if the temperature of exhaust gas is lower than the upper limit temperature, and stops the control to raise the temperature of exhaust gas if the temperature of exhaust gas is equal to or higher than the upper limit temperature. By doing so, the temperature control section 223 can make the temperature of the injection nozzle 13 a temperature lower than the heatproof temperature while maintaining the temperature of the urea aqueous solution N at a temperature equal to or higher than the lower limit temperature (80° C.).

Figure 3:
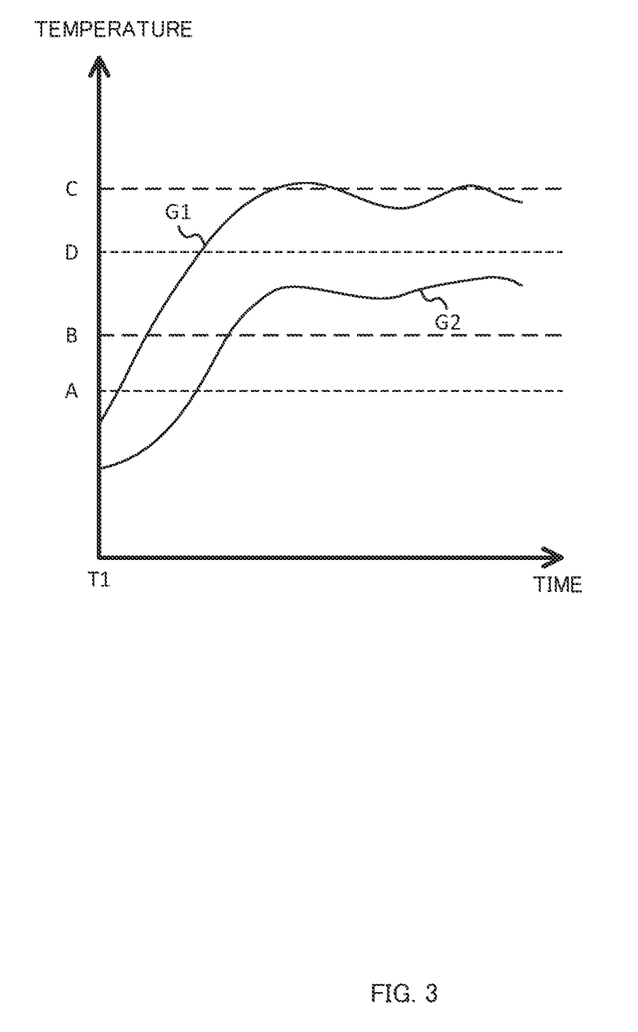
FIG. 3 is a figure for explaining control to raise the temperature of exhaust gas.

FIG. 3 is a figure for explaining the control to raise the temperature of exhaust gas. In FIG. 3, the horizontal axis represents time, and the vertical axis represents temperature. An exhaust gas temperature G1 is a graph representing temperature changes of exhaust gas flowing into the purifying apparatus 16. A urea aqueous solution temperature G2 is a graph representing temperature changes of the urea aqueous solution N having been poured into the injection nozzle 13.

A time T1 is a time at which the temperature raising control is performed. The temperature control section 223 raises the temperature of exhaust gas such that the temperature of the urea aqueous solution N having been poured into the injection nozzle 13 becomes equal to or higher than a lower limit temperature A. Specifically, the temperature control section 223 raises the temperature of exhaust gas such that the exhaust gas temperature G1 becomes equal to or higher than a heating temperature B. Thereby, the temperature control section 223 can make the temperature of the injection nozzle 13 equal to or higher than the lower limit temperature A.

In addition, the temperature control section 223 controls the temperature of exhaust gas such that the temperature of exhaust gas becomes lower than an upper limit temperature C. Specifically, the temperature control section 223 stops the control to raise the temperature of exhaust gas when the temperature of exhaust gas has exceeded the upper limit temperature C. Thereby, the temperature control section 223 can make the temperature of the injection nozzle 13 a temperature lower than a temperature D lower than the heatproof temperature, and accordingly can inhibit malfunctions and performance deterioration of the injection nozzle 13.

[Urea Removal Process Executed by Urea Removing Apparatus 2]

Figure 4:
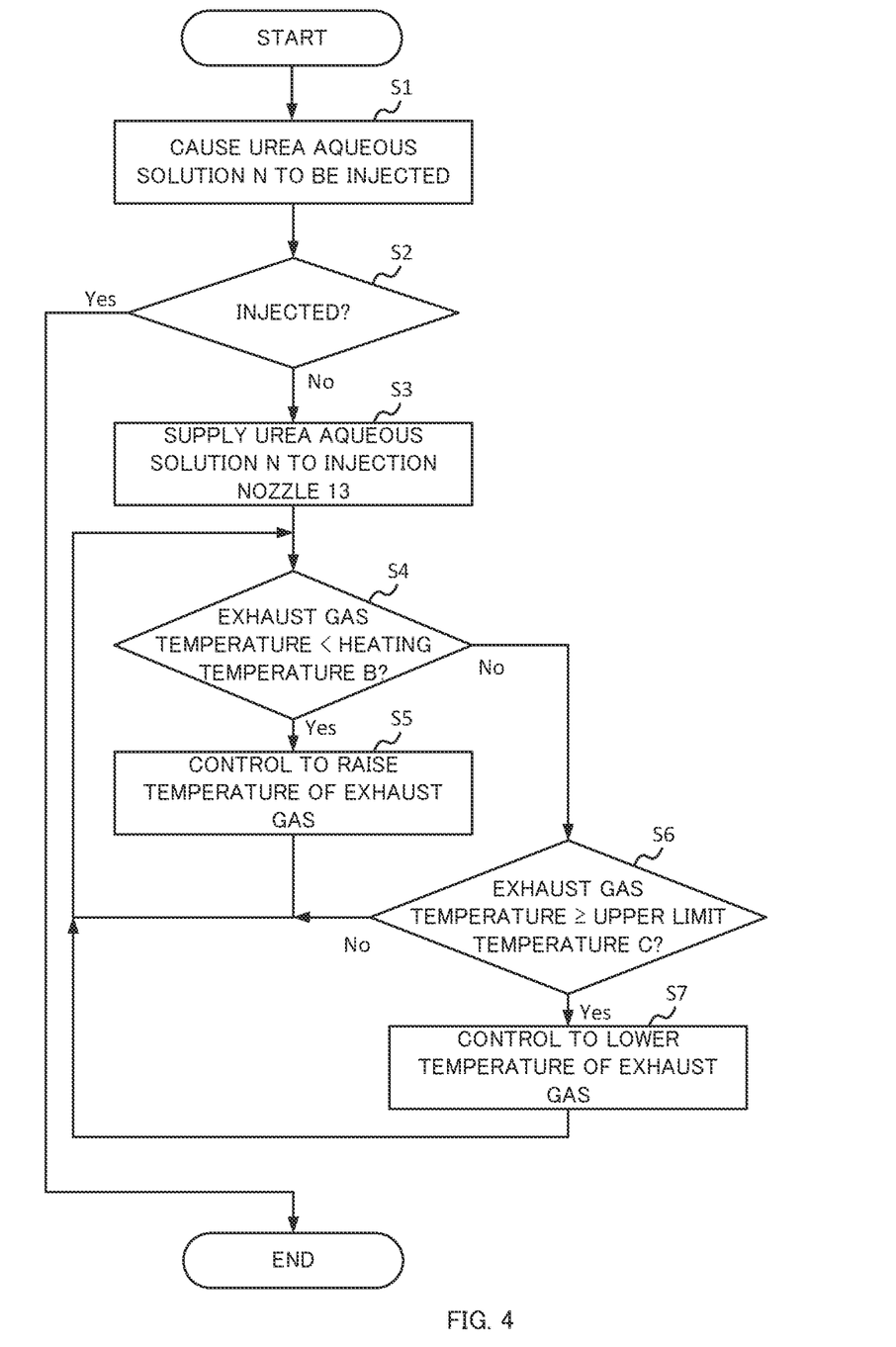
FIG. 4 is a flowchart depicting an example of a urea removal process.

FIG. 4 is a flowchart depicting an example of a urea removal process. The urea removal process is part of diagnostic control to determine whether or not the purifying apparatus 16 and the injection nozzle 13 are functioning normally. For example, the urea removal process is executed at a timing when the diagnostic control to determine whether the purifying apparatus 16 and the injection nozzle 13 are functioning normally is started.

The determining section 221 performs control to inject the urea aqueous solution N from the injection nozzle 13 (Step S1). Specifically, the determining section 221 causes an injection voltage to be applied to the injection nozzle 13 in order to cause the urea aqueous solution N to be injected from the injection nozzle 13.

The determining section 221 determines whether or not the urea aqueous solution N is injected from the injection nozzle 13 (Step S2). For example, the determining section 221 determines whether or not the urea aqueous solution N is injected from the injection nozzle 13 on the basis of whether or not the difference between a local maximum and a local minimum of the function representing temporal changes of the current value until the determination time elapses since the application of the injection voltage is equal to or greater than the determination threshold. If the difference between a local maximum and a local minimum of the function is equal to or greater than the determination threshold (Yes at Step S2), the determining section 221 determines that the urea aqueous solution N is injected from the injection nozzle 13, and ends the process.

If it is determined that the urea aqueous solution N is not injected from the injection nozzle 13 (No at Step S2), the supply control section 222 supplies the urea aqueous solution N to the injection nozzle 13 (Step S3). Specifically, the supply control section 222 controls the pump 15 to repeat the supply/re-intake control, to thereby control the liquid surface of the urea aqueous solution N in the tube 17 having the pipe with the siphon structure. Thereby, air remaining in the tube 17 is replaced with the urea aqueous solution N, and the urea aqueous solution N is supplied from the tank 14 to the injection nozzle 13.

When the urea aqueous solution N supplied from the tank 14 is supplied to the injection nozzle 13, and the urea aqueous solution N has been poured into the injection nozzle 13, the temperature control section 223 determines whether or not the temperature of exhaust gas is lower than the heating temperature B (Step S4). In a case that the temperature of exhaust gas is lower than the heating temperature B (Yes at Step S4), the temperature control section 223 performs the control to raise the temperature of exhaust gas (Step S5). Specifically, when the waiting time has elapsed since the supply control section 222 started the control to supply the urea aqueous solution N to the injection nozzle 13, the temperature control section 223 starts the heating control to perform fuel injection to the combustion chamber four times in one combustion cycle, and raises the temperature of exhaust gas.

In a case that the temperature of exhaust gas is equal to or higher than the heating temperature B (No at Step S4), the temperature control section 223 determines whether or not the temperature of exhaust gas is equal to or higher than the upper limit temperature C (Step S6). In a case that the temperature of exhaust gas is equal to or higher than the upper limit temperature C (Yes at Step S6), the temperature control section 223 executes control to lower the temperature of exhaust gas (Step S7). For example, the temperature control section 223 stops the heating control if the heating control is being implemented. In addition, the temperature control section 223 supplies a coolant of the engine 11 to the injection nozzle 13.

In a case that the temperature of exhaust gas is lower than the upper limit temperature C (No at Step S6), the temperature control section 223 returns to Step S4. The urea removing apparatus 2 repeats Step S4 to Step S7 while the diagnostic control is being executed.

The determining section 221 continues causing an injection voltage to be applied to the injection nozzle 13 also while the heating control is being performed. The determining section 221 determines that the urea aqueous solution N is injected if the difference between a local maximum and a local minimum of the function representing temporal changes of the current value has become equal to or greater than the determination threshold. The temperature control section 223 ends the heating control when the determining section 221 determines that the urea aqueous solution N is injected.

The determining section 221 determines that the urea aqueous solution N is not injected while the difference between a local maximum and a local minimum of the function representing temporal changes of the current value is smaller than the determination threshold. The temperature control section 223 continues the heating control while the determining section 221 determines that the urea aqueous solution N is not injected. If the difference between a local maximum and a local minimum of the function representing temporal changes of the current value is smaller than the determination threshold even after a lapse of the predetermined diagnostic time since the start of the diagnostic control, the determining section 221 determines that the injection nozzle 13 is anomalous. It is sufficient if the diagnostic time is set as appropriate in accordance with specifications of a vehicle on which the purification system S is mounted, and the like, and is set to 1,500 seconds, for example.

[Advantages of Urea Removing Apparatus 2]

As explained above, the urea removing apparatus 2 performs the control to raise the temperature of exhaust gas in a state where the urea aqueous solution N has been poured into the injection nozzle 13. Thereby, exhaust gas having an increased temperature reaches the injection nozzle 13, this increases the temperature of the urea aqueous solution N having been poured into the injection nozzle 13, and accordingly the solubility of the urea aqueous solution N rises. As a result, it becomes easier for urea adhered to the injection nozzle 13 to melt into the urea aqueous solution N in a short time, and the urea adhered to the injection nozzle 13 can be removed.

In addition, since the urea aqueous solution N has been poured into the injection nozzle 13, it becomes difficult for the temperature of the injection nozzle 13 to rise even if the temperature of exhaust gas is raised. Accordingly, an undesirable increase of the temperature of the injection nozzle 13 over the heatproof temperature of the injection nozzle 13 is inhibited, and accordingly malfunctions and performance deterioration of the injection nozzle 13 can be inhibited.

The present disclosure has been described above on the basis of the exemplary embodiments. The technical scope of the present disclosure is not limited to the scope explained in the above embodiments, and it is obvious to those skilled in the art that various changes and modifications within the scope of the invention may be made. An aspect to which such changes and modifications are added can be included in the technical scope of the present invention is obvious from the description of the claims. For example, whereas the temperature control section 223 is part of the urea removing apparatus 2 in the embodiment described above, this is not the sole example, an engine control apparatus that controls the engine power/exhaust temperature mainly by engine fuel injection may be installed as the temperature control section 223 separately from the urea removing apparatus 2, and perform coordinated control together with the urea removing apparatus 2 by using CAN (Controller Area Network) communication or the like.

What is claimed is:

1. A urea removing apparatus comprising:
   a determining section that determines whether or not a urea aqueous solution is injected from an injection nozzle when control is performed to inject the urea aqueous solution from the injection nozzle into an exhaust pipe where exhaust gas of an engine flows;
   a supply control section that controls a pump that supplies the urea aqueous solution from a tank that stores the urea aqueous solution to the injection nozzle, and causes the urea aqueous solution to be supplied from the tank to the injection nozzle in a case that it is determined that the urea aqueous solution is not injected from the injection nozzle; and
   a temperature control section that performs control to raise a temperature of exhaust gas in a state where the urea aqueous solution supplied from the tank has been poured into the injection nozzle.

2. The urea removing apparatus according to claim 1, wherein the temperature control section performs the control to raise the temperature of exhaust gas such that a temperature of the urea aqueous solution having been poured into the injection nozzle becomes equal to or higher than a lower limit temperature at which aqueous solubility of urea becomes predetermined solubility.

3. The urea removing apparatus according to claim 2, wherein the temperature control section performs the control to raise the temperature of exhaust gas such that the temperature of the urea aqueous solution having been poured into the injection nozzle becomes equal to or higher than the lower limit temperature, and additionally a temperature of the injection nozzle becomes lower than an upper limit temperature according to a heatproof temperature of the injection nozzle, the upper limit temperature being higher than the lower limit temperature.

4. The urea removing apparatus according to claim 1, wherein the temperature control section raises the temperature of the exhaust gas by continuing, for a predetermined period, control to cause a fuel injecting section that injects a fuel a combustion chamber of the engine to perform fuel injection multiple times in one combustion cycle of the engine.

5. The urea removing apparatus according to claim 1, wherein the supply control section performs control to supply the urea aqueous solution to the injection nozzle while diagnostic control to determine whether or not a purifying apparatus that purifies the exhaust gas is functioning normally is implemented.

6. The urea removing apparatus according to claim 1, wherein the determining section determines that the urea aqueous solution is injected from the injection nozzle in a case that, when injection control is performed to inject the urea aqueous solution in the injection nozzle by causing an injection voltage to be applied to the injection nozzle, a difference between a local maximum and a local minimum of a function representing temporal changes of a current value until determination time elapses since the application of the injection voltage to the injection nozzle is equal to or greater than a determination threshold, and determines that the urea aqueous solution is not injected from the injection nozzle in a case that the difference is smaller than the determination threshold.

7. The urea removing apparatus according to claim 6, wherein the determining section determines that the urea aqueous solution is injected from the injection nozzle in a case that the injection voltage is applied to the injection nozzle after the control to raise the temperature of exhaust gas is started, and the difference that is observed when the injection voltage is applied is equal to or greater than the determination threshold.

8. The urea removing apparatus according to claim 7, wherein
   the determining section continues causing the injection voltage to be applied to the injection nozzle after the control to raise the temperature of exhaust gas is started, and
   the temperature control section ends the control to raise the temperature of exhaust gas when the determining section determines that the urea aqueous solution is injected from the injection nozzle after the control to raise the temperature of exhaust gas is started.

9. The urea removing apparatus according to claim 1, wherein the temperature control section starts the control to raise the temperature of exhaust gas when waiting time required for the urea aqueous solution to have been poured into the injection nozzle has elapsed since a starting time point of control to supply the urea aqueous solution to the injection nozzle.

* * * * *